United States Patent
Raponi et al.

(10) Patent No.: US 6,913,720 B2
(45) Date of Patent: Jul. 5, 2005

(54) NON-WOVEN FABRIC WITH FLAME RETARDANT PROPERTIES AND METHOD OF MAKING SAME

(76) Inventors: Anthony S. Raponi, c/o Nolar Industries Limited, 602 Millway Avenue, Concord, Ontario (CA), L4K 3V3; Lawrence J. Raponi, c/o Nolar Industries Limited, 602 Millway Avenue, Concord, Ontario (CA), L4K 3V3

( * ) Notice: Subject to any disclaimer, the term of this patent is extended or adjusted under 35 U.S.C. 154(b) by 172 days.

(21) Appl. No.: 10/315,004

(22) Filed: Dec. 10, 2002

(65) Prior Publication Data

US 2003/0114070 A1 Jun. 19, 2003

Related U.S. Application Data

(60) Provisional application No. 60/340,263, filed on Dec. 18, 2001.

(51) Int. Cl.[7] .............................. D04H 1/42; D04H 1/46; D04H 1/70
(52) U.S. Cl. ........................ 264/103; 28/107; 156/62.2; 156/62.4; 156/62.8; 156/148; 156/229; 264/109; 264/115; 264/141; 264/210.1; 264/211; 264/234; 264/288.4; 264/345

(58) Field of Search .................. 264/103, 109, 264/115, 141, 210.1, 211, 234, 288.4, 345; 156/62.2, 62.4, 62.8, 148, 229; 28/107; 19/98, 296

(56) References Cited

U.S. PATENT DOCUMENTS

| | | | | | |
|---|---|---|---|---|---|
| 4,199,644 | A | * | 4/1980 | Platt | ........................ 28/107 X |
| 5,879,487 | A | * | 3/1999 | Ravella | ..................... 156/62.8 |
| 5,968,855 | A | * | 10/1999 | Perdelwitz et al. | ..... 264/103 X |

* cited by examiner

Primary Examiner—Leo B. Tentoni

(57) ABSTRACT

A non-woven fabric which consists of a blend 75% to 95% by weight of polypropylene based fibers and 5 to 25% by weight of polyester based fibers. The polypropylene fibers are extruded from a melt mixture of about 80 to 99% by weight polypropylene and about 1 to 20% by weight of a suitable heat stabilizer. The polyester based fibers are extruded from a melt mixture of 80% to 100% by weight polyester and 0 to 20% by weight of other stabilizers and/or fire retardants. The flame retardant compounds are added to and blended with the polyester melt prior to the extrusion of the polyester based fibers. Most preferably, the extruded polypropylene and polyester based fibers are staple fibers of between about 2 and 12 denier.

11 Claims, 1 Drawing Sheet

NON-WOVEN FABRIC WITH FLAME RETARDANT PROPERTIES AND METHOD OF MAKING SAME

RELATED APPLICATIONS

Figure 1:
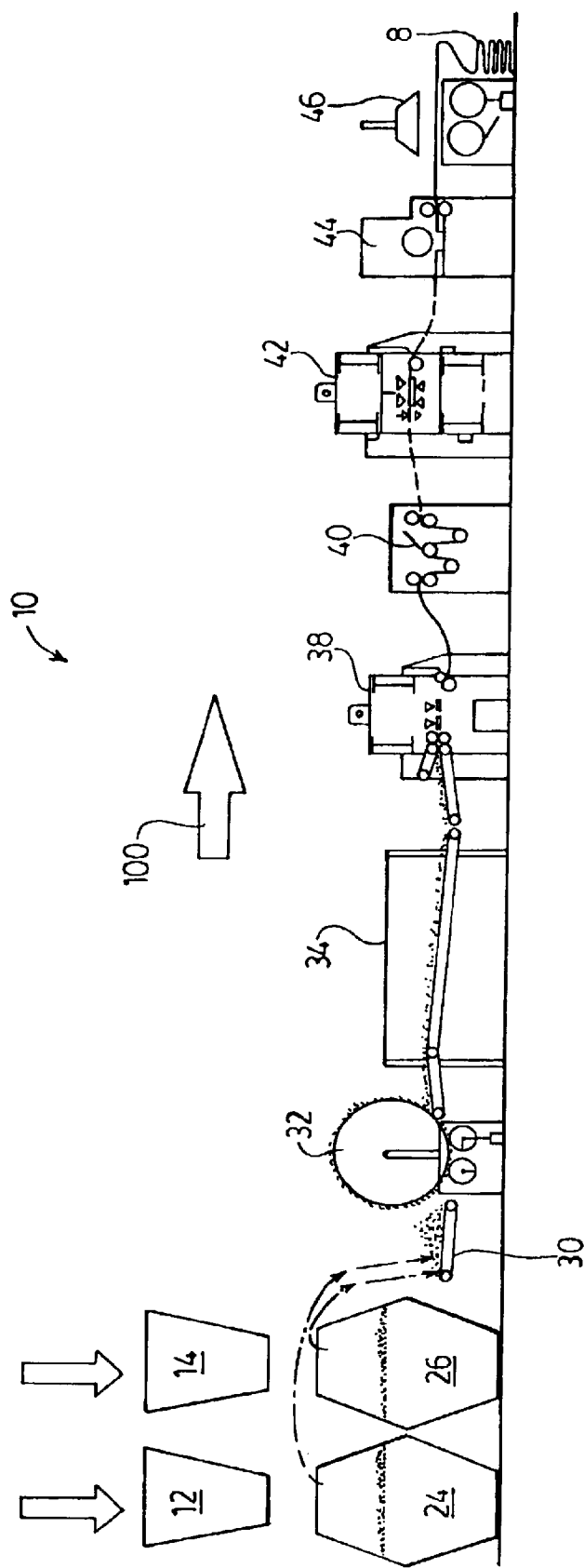

This application claims the benefit under 35 U.S.C. §119 (e) to U.S. Provisional Application Ser. No. 60/340,263, filed 18 Dec. 2001.

SCOPE OF THE INVENTION

The present invention relates to a non-woven fabric having flame retardant properties and its method of manufacture, and more particularly, non-woven fabric which is comprised of a blend of polypropylene and polyester based fibers, and which in an optimum construction includes polyester fibers which have been treated with a flame retardant.

BACKGROUND OF THE INVENTION

Presently, non-woven fabrics are used in automobile manufacturing for seating, carpets, air bag drapes or skirts, and as speaker cabinet covers. Typically, conventional non-woven fabrics consist of 100% polyester fibers or 100% polypropylene fibers which have been heat fused by hot calendaring. These conventional non-woven fabrics have proven to lack sufficient structural integrity, and the fibers may tend to pull apart if left exposed to higher temperature environments and/or used to support the hooked strips of hook-and-loop type fasteners such as those sold under the trade mark VELCRO™.

In addition, Motor Vehicle Safety Standard FMVSS 302 has been adopted by the automotive industry as a standard of flame retardancy for fabrics used in vehicles. Under FMVSS 302, a fabric must show in a horizontal burn test, a horizontal burn rate of a maximum of 4 inches per minute. To achieve this flame retardant standard, conventional non-woven fabrics consisting of either 100% polypropylene or 100% polyester fibers have heretofore been treated with a polybrominate diphenyl ether (PBDE's) as a flame retardant such as those sold under the trade marks Typar™ and Duon™. Recently, however, environmental concerns have prompted a trend to eliminate the use of PBDE's as flame retardants in manufacturing. In particular, there has been a growing concern over the impact of PBDE'sas a toxic material which may have not only had an adverse effect on the environment, but also on human health.

SUMMARY OF THE INVENTION

Accordingly it is an object of the invention to provide a non-woven fabric which has enhanced structural integrity so as to resist fiber separation, and which is suitable to supportingly engage the hooked strips of hook-and-loop-type fasteners.

It is a further object of the present invention to provide a non-woven fabric which is suitable for use in rail, automobile and aircraft manufacture, and which complies with the FMVSS 302 protocol, and which does not incorporate PBDE flame retardants.

Another object of the invention is to provide a method of manufacturing a non-woven fabric which is suitable for use in vehicle manufacturing as seating, carpets, air bag drapes and the like, and which has a stable fiber orientation.

A further object of the invention is to provide a non-woven fabric which possesses the sufficient properties of loft and a staple fiber orientation to permit the use of the fabric in supporting the hook members of hook-and-loop-type fasteners, such as those sold under the trade mark Velcro™, in place of the fastener loop-strip.

To achieve at least some of the aforementioned objects, the present invention provides for a non-woven fabric which consists of a blend 75% to 95% by weight of polypropylene based fibers and 5 to 25% by weight of polyester based fibers. The polypropylene fibers are extruded from a melt mixture of about 80 to 99% by weight polypropylene and about 1 to 20% by weight of a suitable heat stabilizer. The polyester based fibers are extruded from a melt mixture of 80% to 100% by weight polyester and 0 to 20% by weight of other stabilizers and/or fire retardants.

Where the fabric is to be used in vehicle, aircraft and/or rail car manufacture, the fabric is also provided with a suitable flame retardant compound which may be applied as a coating for either the completed fabric, or applied to the polypropylene and/or polyester fibers prior to the fabric manufacture. Most preferably, however, the flame retardant compounds are added to and blended with the polyester melt prior to the extrusion of the polyester based fibers. Most preferably, the extruded polypropylene and polyester based fibers are staple fibers of between about 2 and 12 denier, wherein the polyester fibers have been melt blended with a suitable flame retardant compound (i.e. polyester F.R. fibers)

The flame retardant compound used to treat the polyester based fibers may comprise a phosphorous based flame retardant, however, other types of flame retardant compounds may also be used. Where phosphorous based flame retardants are used, it has been found that the addition of the flame retardant compound to the polyester melt in an amount of 1% to 10% by weight (of the polyester/flame retardant melt blend), and more preferably about 4% by weight of a flame retardant composition comprising approximately 20% by weight active tris phosphorous as the flame retardant, achieves an optimum treated polyester fiber for use in the present invention.

In a further preferred embodiment, the flame retardant compound used in the polyester based fibers comprises about 1 to 10% and most preferably about 4% by weight (of the polyester/flame retardant blend) of Polymer K0861-052A™ as sold by Eastman Chemical Company of Tennessee, U.S.A.

In a preferred embodiment, the fabric consists of between about 80 to 92%, by weight polypropylene based fibers and about 8 to 20% by weight flame retardant treated polyester based fibers, with the polypropylene based fibers comprising 1 to 10% by weight heat resistant stabilizer, and the polyester based fibers comprising 1 to 10% by weight flame retardant. In a more highly preferred embodiment, the fabric comprises about 90% by weight polypropylene based fibers and about 10% by weight flame retardant treated polyester based fibers.

In manufacture of a fabric having a sufficiently stable staple fiber orientation to permit its use in supporting the hooked strips of hook-and-loop-type fasteners, the extruded staple polypropylene based fibers and polyester based fibers are blended in a preferred blend ratio of 75% to 95% polypropylene based fibers and 5 to 25% by weight polyester based fibers. The blended fibers are then carded to form a loose fiber mat which is then processed on a cross-lapper. Preferably, the loose fiber mat is processed on the cross-lapper to produce a cross-lapped mat of between about 2 and 6 half inch thick layers. Following cross-lapping, the mat is passed through a tacker loom, and thereafter stretched to between 120% and 180% of its original length. Once stretched, the drafted fabric is needle punched by a main loom, after which the fabric is hot oiled calendared at between 250° and 400° Fahrenheit at a pressure of between 700 and 1300 psi on at least one side. Optionally, following calendaring, the fabric may be further exposed to heat at 150° to 350° Fahrenheit on at least one side for fabric shrinkage control.

Accordingly, in one aspect, the present invention resides in a non-woven fabric comprising, 75 to 95% by weight polypropylene based fibers, said polypropylene based fibers comprising about 80 to 99% by weight polypropylene and 1 to 20% by weight of a heat stabilizer;

5 to 25% by weight polyester based fibers, said polyester based fibers comprising about 80 to 100% by weight polyester and 0 to 20% by weight of a flame retardant;

said polypropylene fibers and said polyester based fibers being substantially randomly admixed and at least partially cross-linked.

In another aspect, the present invention resides in a method of manufacturing a non-woven fabric comprising 75 to 95% by weight polypropylene based fibers, said polypropylene based fibers comprising about 80 to 99% by weight polypropylene and 1 to 20% by weight of a heat stabilizer, and 5 to 25% by weight polyester based fibers, said polyester based fibers comprising 80 to 100% by weight polyester and 0 to 20% by weight of a flame retardant, said fabric being manufactured by:

admixing staple polypropylene based fibers and staple polyester fibers in an amount of 75 to 95% by weight polypropylene based fibers and 5 to 25% by weight polyester based fibers, carding the admixed fibers by a textile card to form a mat aligned in a processing direction, processing the mat in the processing direction through a main loom with a needle penetration of between about 3 and 12 mm, hot calendaring the processed mat at a temperature of about 250 to 400° F. and a pressure of between about 700 and 1200 psi on one first side only.

In a further aspect, the present invention resides in a needle punch non-woven flame retardant fabric comprising, 80 to 92% by weight six denier polypropylene based fibers, said polypropylene based fibers comprising about 80 to 99% by weight polypropylene and 0 to 20% by weight of a heat stabilizer;

8 to 20% by weight five denier polyester based fibers, said polyester based fibers comprising about 90 to 98% by weight polyester and 2 to 10% by weight of a phosphorous based flame retardant;

said fabric further characterized by
said polypropylene based fibers and said polyester based fibers being contact heat fused to each other on one first side of said fabric only, and wherein the second other side of said fabric being characterized by said polypropylene based fibers and said polyester based fibers being only partially fused to each other.

DETAILED DESCRIPTION OF THE DRAWINGS

Reference will now be made to the following detailed description taken together with the accompanying drawing in which:

FIG. 1 schematically illustrates a system for use in the manufacture of a needle punch non-woven fabric in accordance with a preferred embodiment of the invention.

DETAILED DESCRIPTION OF THE PREFERRED EMBODIMENT

In its most preferred embodiment, the present invention provides for a non-woven needle punch fabric which complies with Motor Vehicle Safety Standard FMVSS 302. The fabric may for example be used in seating applications for vehicle manufacture, as well as other applications in aircraft, rail and transportation vehicle manufacture, including in draperies, airbags, speaker cabinets and the like. It is to be appreciated however, that the fabric of the present invention may be used in a variety of other applications where flame retardant fabrics are used.

The fabric consists of 90% by weight of staple polypropylene based fibers, and 10% by weight of flame retardant treated polyester based fibers which have been crossed-lapped and partially heat fused together. The polypropylene based fibers comprise five to seven denier fibers which have been extruded from a melt of about 80 to 99% by weight polypropylene and about 1 to 20% by weight of a heat resistant stabilizer. More preferably, the polypropylene based fibers are mostly five denier fibers comprising about 96% by weight polypropylene and about 4% by weight of an antioxidant heat stabilizer such as that sold as AO-3251™ sold by Modern Dispersions Inc. of Leominster, Md.

The treated polyester based fibers comprise mostly four to six denier fibers which have been extruded from a hot melt mixture of about 80 to 99% by weight polyester and 1 to 20% by weight of a phosphorous based flame retardant. More preferably, the polyester fibers are mostly six denier fibers of about 96% by weight polyester and 4% by weight of a flame retardant such as Eastman Chemical flame retardant KO861-052A™.

The fabric is preferably provided with a thickness of between about 0.5 to 10 millimeters, and more preferably about 1 to 3 millimeters, however, other thicknesses may be used depending upon the intended fabric applications.

The fabric is characterized as having staple fibers which are only directly heat fused on one planar side leaving the other side partially melt bonded. The heat fusing of the fibers on one side of the fabric advantageously provides the fabric with structural integrity, while enabling the partially melt bonded side of the fabric to be used with the hooked strips of a hook-and-loop-type fasteners, in place of a conventional loop pad. More particularly, because the polypropylene and polyester based fibers are contact heat fused on only one side of the fabric, fabric fibers on the uncontacted side are subject to only partial melting and retain a looser fiber orientation which permits engagement of the hooked strip. The uncontacted side thus allows maximum fiber adhesion with the hooks of hook-and-loop-type fasteners while the heat fusion of the fibers on the contacted side ensures the fabric fibers will not separate sufficiently to result in the failure of the fabric.

Reference is made to FIG. 1 which illustrates schematically a production line 10 used in the manufacture of the non-woven needle punch fabric 8 in accordance with the present invention. The production line 10 operates in line direction of arrow 100 at a production line speed of between about 30 and 60 feet/minute, and preferably approximately 45 feet/minute and at 71° F. and 55% relative humidity. FIG. 1 shows the production line 10 as including a pair of extruders 12,14 which may be provided on or off site. The extruders 12,14 are adapted to extrude respectively the five denier polypropylene based staple fibers and the 6 denier polyester fibers having lengths of between about 0.4 and 4 cm.

In the extrusion of the polypropylene based fibers, polypropylene pellets are admixed with a heat stabilizer such as antioxidant heat stabilizer AO-3251™ in a preferred amount, and preferably at about 96% by weight polypropylene pellets and 4% by weight heat stabilizer. The mixture is then fed into the extruder 12 and melt blended. The hot melt is then extruded from the extruder 12 in the form of the five denier staple fibers which are thereafter bundled and stored in bails 24.

Similarly, in the extrusion of the polyester based fibers, polyester pellets are admixed with between about 1 and 10% by weight, and most preferably 4% by weight of a pelletized phosphorous based flame retardant. In a most highly preferred embodiment, the pelletized based flame retardant is flame retardant Product No. K0861-052A™ sold by Eastman Chemical Company of Kingsport, Tenn. The phosphorous based flame retardant sold under Product Identification No K0861-052A, is believed to contain approximately 20% phosphorous as the active flame retardant ingredient. It is to be appreciated that other phosphorous and non-phosphorous based flame retardants could, however, also be used and/or the concentration of phosphorous varied. The polyester/flame retardant mixture is fed into the extruder 14 and melt blended. The melt is extruded from the extruder 14 as the six denier flame retardant treated staple polyester based fibers (hereafter polyester (FR)), which are thereafter bundled and stored in bails 26.

In a ratio of 10% by weight six denier polyester (FR) based fibers and 90% by weight five denier polypropylene based fibers, the fibers are removed from the bundles 24,26 and are manually or mechanically placed on a feed conveyor 30 as a loose randomly oriented fiber mixture. The loose fiber mixture is initially moved through a Hollingsworth™ textile card 32 which orients the fibers as a loose fiber mat. Once carded, the fiber mat is moved into a cross-lapper 34 where the mat is cross-lapped into four approximately 0.5 inch layers.

The cross-lapped fabric mat moves from the cross-lapper 34 through a tacker loom 38. The tacker loom 38 operates to loosely interconnect the mat layers by means of barbed needle penetration. The loom 38 achieves an optimum fabric needle penetration at between about 8 and 22 millimeters, and preferably approximately 15 millimeters and an advance rate of 10 millimeters per stroke, achieving an average needle punch of approximately 29 punches per square centimeter to pre-secure cross-lapped layers. Following initial needle punching by the tacker loom 38, the fabric is stretched by drafting on stretching rollers 40 to about 140% its production line length. After drafting, the stretch fabric is moved through a main loom 42. The main loom 42 is operable to provide a barbed needle penetration of between about 3 and 12 millimeters, and preferably about 8 millimeters. The fabric is advanced through to main loom 42 at 15 millimeters per stroke and having an average needle punch of between about 100 and 125 punches, and preferably 113 punches per square centimeter.

Following processing by the main loom 42, the fabric is moved through a calendar 44 where it is hot oil calendared between about 250 and 400° F., preferably at 350° Fahrenheit and 700 to 1200 psi, preferably 950 psi on one side only. It is has been found that hot oil calendaring on only one side of the fabric advantageously results in the non-calendared side having polypropylene and polyester fibers which are incompletely melt bonded so as to allow interengagement with the fibers and hooks of hook-and-loop fasteners and the maximum fiber adhesion to the hook strips. This advantageously permits the fabric to function in a similar matter to the faster loop pad.

Following calendar rolling, the fabric is passed through a final heating station 48. At heating station 48, the fabric is exposed to infrared heat at between about 150° F. and 350° F., and preferably 220° Fahrenheit on the calendar rollered side only, for fabric shrinkage control.

The applicant has discovered that the density of the drafted cross-lap web in combination with needling technologies and temperature variables in the heat set process (i.e. calendared or infrared), achieves a more stable product. Furthermore, the manufacturing process of the present invention accomplishes the superior advantage when adhered to Velcro™ and other hook and loop-type products.

In comparative test results, the tensile strength of sample non-woven fabrics of the present invention, both with and without a heat stabilizer, were compared with a conventional non-woven fabric of 100% polyester following heat aging at 1,000 hours at 110° C. and 95% relative humidity.

| COMPARATIVE TEST RESULTS | | | | | |
|---|---|---|---|---|---|
| Sample Fabric (without heat stabilizer) | | Sample Fabric (with heat stabilizer) | | 100% Polyester | |
| Machine | Cross | Machine | Cross | Machine | Cross |
| Original (N) | | | | | |
| 418 | 461 | 460 | 389 | 207 | 253 |
| 110° C. Heat Aged 1,000 hrs. (N) | | | | | |
| 405 | 474 | 454 | 450 | 97 | 118 |
| Retained Strength (%) | | | | | |
| 97 | 103 | 99 | 116 | 47 | 47 |

* Test Criteria: ASTM D4632-91

Although FIG. 1 illustrates the invention as including a single infrared heating station 48, it is be appreciated that additional infrared heaters my be provided on the opposite side of the conveyor 30, so as to heat and partially fuse the fibers on both sides of the formed sheet.

Although the preferred embodiment of the invention describes the fabric as including a phosphorous based flame retardant which is melt blended into the extruded polyester fibers, the invention is not so limited. Other types of fire retardants could be melt blended into either the polypropylene and/or polyester fibers or applied as a coating to either the individual fibers following their extrusion. Where fire retardancy is not critical, in a less preferred embodiment the flame retardant may be omitted in its entirety.

Although the detailed description describes the polypropylene based fibers as including an antioxidant based heat stabilizer, other suitable heat stabilizers could also be used either as part of the polypropylene fibers and/or as an additive with polyester based fibers.

Although the detailed description describes and illustrates a preferred fabric composition and method of its manufacture, the invention is not so limited. Many variations and modifications will now occur to persons skilled in the art.

We claim:

1. A method of manufacturing a non-woven fabric comprising 75 to 95% by weight polypropylene based fibers, said polypropylene based fibers comprising about 80 to 99% by weight polypropylene and 1 to 20% by weight of a heat stabilizer, and 5 to 25% by weight polyester based fibers, said polyester based fibers comprising 80 to 100% by weight polyester and 0 to 20% by weight of a flame retardant, said fabric being manufactured by:

admixing staple polypropylene based fibers and staple polyester based fibers in an amount of 75 to 95% by weight polypropylene based fibers and 5 to 25% by weight polyester based fibers, carding the admixed fibers by a textile card to form a mat aligned in a processing direction, processing the mat in the processing direction through a main loom with a needle penetration of between about 3 and 12 mm, hot calendaring the processed mat at a temperature of about 250 to 400° F. and a pressure of between about 700 and 1200 psi on one first side only.

2. The method of claim 1 wherein following said hot calendaring, heating said first side at a temperature of between about 150 and 350° F. for fabric shrinkage control.

3. The method of claim 2 wherein immediately following said carding, further cross-lapping said mat to a thickness of between about 2 and 6 layers.

4. The method of claim 3 wherein following said cross-lapping, processing said mat through a tacker loom with a needle penetration selected at between about 8 and 22 mm, and stretching said mat in said processing direction to between about 120% and 160% of its original length prior to said processing by said main loom.

5. The method of claim 4 wherein said mat is processed in the processing direction at a rate of between about 30 and 60 feet/minute.

6. The method as claimed in claim 2 wherein said main loom has an average needle punch of between about 100 and 125 punches per square centimeter.

7. The method as claimed in claim 2 wherein said polypropylene based fibers comprise five denier fibers extruded from a melt comprising about 96% polypropylene and about 4% of said antioxidant heat stabilizer.

8. The method as claimed in claim 7 wherein said polyester based fibers comprise six denier fibers extruded from a hot melt comprising 90 to 99% by weight polyester and 1 to 10% by weight phosperous based flame retardant.

9. The method as claimed in claim 8 wherein the polyester based fibers are extruded from a hot melt comprising about 4% by weight of said phosphorous based flame retardant.

10. The method as claimed in claim 2 wherein said staple polypropylene based fibers and said staple polyester based fibers are admixed in an amount of 85 to 94% by weight polypropylene based fibers, and 6 to 15% polyester based fibers.

11. The method as claimed in claim 7 wherein said staple fibers are admixed in an amount of about 90% by weight polypropylene based fibers and 10% by weight polyester based fibers.

* * * * *